July 21, 1936.  L. J. GRIFFEY  2,048,607
TIME CONTROL MECHANISM
Filed Feb. 26, 1935  2 Sheets—Sheet 2
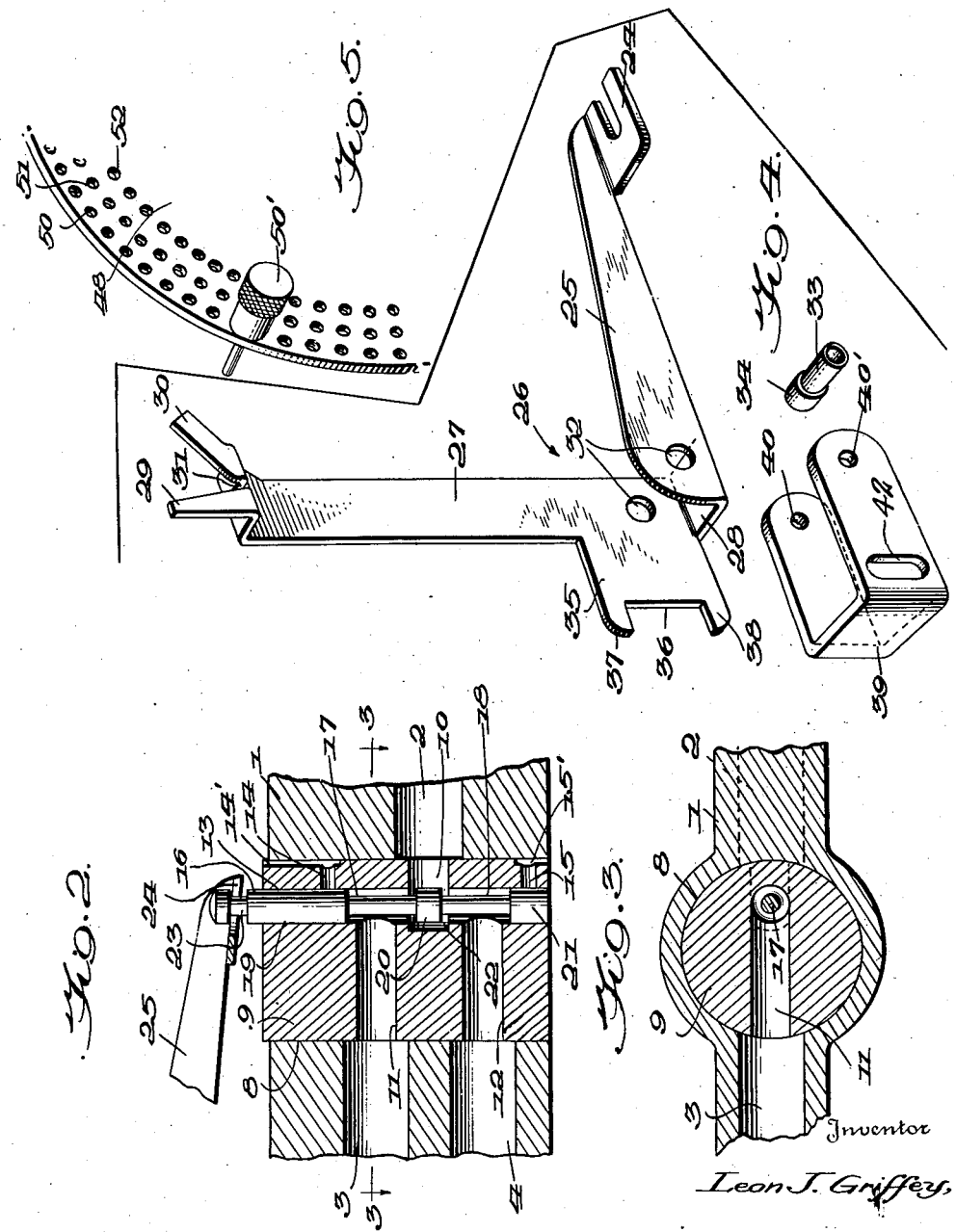

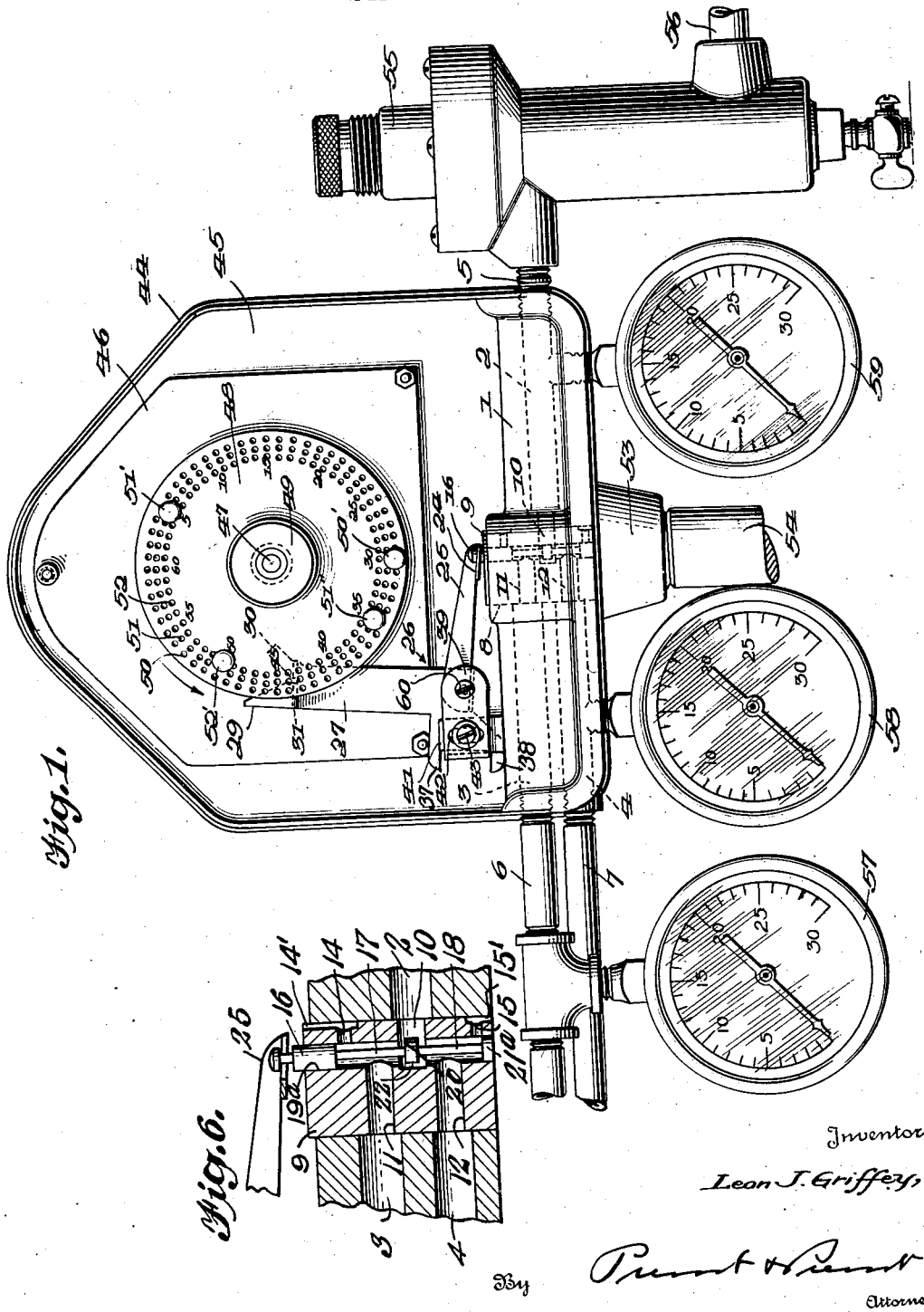

Patented July 21, 1936

2,048,607

UNITED STATES PATENT OFFICE 2,048,607

TIME CONTROL MECHANISM

Leon J. Griffey, Tulsa, Okla., assignor to Hanlon-Waters, Inc., Tulsa, Okla.

Application February 26, 1935, Serial No. 8,359

10 Claims. (Cl. 161—7)

My invention consists in new and useful improvements in a time controlled pilot valve mechanism and is primarily directed to a device of this character for use in connection with a plurality of motor valves for intermittently actuating one or more of said motor valves at predetermined intervals through the medium of a common pilot control.

One object of my invention is to provide a time controlled pilot valve assembly which may be readily adjusted and regulated to control the opening and closing of a plurality of main control valves at variable periods throughout any desired span of time.

Another object of my invention resides in the pilot valve actuating mechanism whereby a common pilot valve is brought into various operative positions to control and direct the flow of a motor valve operating pressure fluid to any one or all of a series of motor valves for a predetermined period, or vent said operating fluid from said motor valves to atmosphere to relieve the operating pressure for a predetermined period.

Still another object of my invention is to provide mechanism of this type which is particularly adapted for use in connection with the flowing of oil wells on a variable intermittent time schedule.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a view in front elevation showing my improved time controlled pilot valve with the cover of the housing removed.

Fig. 2 is an enlarged sectional detail of the pilot valve structure per se.

Fig. 3 is a sectional view of the pilot valve structure taken on line 3—3 of Fig. 2.

Fig. 4 is an enlarged perspective detail showing the supporting yoke and operating connection or valve lever between the pilot valve and the clock driven disc, Fig. 5 is an enlarged fragmentary perspective view showing a portion of the clock driven disc, and Fig. 6 is a sectional view of a modified form of pilot valve.

In the drawings, 1 represents a base member which is preferably composed of suitable cast metal and is provided with a plurality of longitudinally extending fluid passageways 2, 3, and 4. The passageway 2 extends from one end of the base member 1 with its outer end threaded to receive a suitable inlet connection 5, and the passageways 3 and 4 extend from the opposite end of said base member with their outer ends threaded to receive suitable discharge connections 6 and 7, respectively, all of said passageways terminating inwardly in an intersecting circular opening 8 which extends vertically through the central portion of the base member 1.

The central opening 8 is adapted to receive a cylindrical pilot valve insert 9 which is machined to fit snugly within the opening and is provided with a series of horizontal ports which register with the respective passageways in the body portion when the valve insert is in place. On the side of the valve insert adjacent passageway 2, a central port 10 registers with passageway 2, while on the opposite side of the valve insert adjacent the passageways 3 and 4, upper and lower ports 11 and 12 register with passageways 3 and 4, respectively.

The valve insert 9 is vertically drilled as at 13 to form a pilot valve bore which extends entirely through the insert and serves as a means of communication between passageway 2 and passageways 3 and 4 through their respective ports, said bore also communicating with vent ports 14 and 15 provided in the valve body, respectively above and below the port 10. These vent ports terminate at the periphery of the valve insert in channels 14' and 15', respectively, which lead to atmosphere at the vertical extremities of the valve insert for the purpose hereinafter set forth.

16 represents the pilot valve per se which consists of an elongated member of a suitable shape and size in cross section to fit closely within the bore 13 of the valve insert and adapted to reciprocate therein, said valve member being reduced as at 17 and 18 intermediate its ends to form three distinct valve heads 19, 20, and 21, spaced apart at predetermined points with respect to the ports in the valve insert. The heads 19 and 21 are arranged to control the vent to atmosphere through ports 14 and 15, and are so spaced on the valve member according to the relative position of the valve member within the bore 13, that both of these vent ports may be closed at the same time or either one opened and the other closed. The intermediate head 20 is adapted to normally lie adjacent the central port 10 in the valve insert, and the bore 13 is enlarged at this point as at 22 to provide a valve cavity within which the head 20 is adapted to float. The valve cavity 22 is sufficiently larger in area than the valve head 20 to provide a clearance around the latter so that when the head is in its intermediate position, the port 10 communicates through the bore 13 with both ports 11 and 12, but when in either its upper or lower positions, the bore 13 is either throttled or shut off from communication with one or the other of said ports 11 and 12, as the case may be.

The upper extremity of the valve member 16 is reduced as at 23 to provide a headed valve stem slidably engageable by a complementary recessed lug 24 carried at one end of the horizontal arm 25 of a substantially L-shaped rocker arm or valve lever 26. This valve lever is preferably formed by stamping a blank from any suitable sheet metal which is bent as shown in detail in Fig. 4 to form a horizontal arm 25 and a vertical arm 27, spaced apart and joined by a connecting web 28. The horizontal arm 25 is bent upwardly and disposed edgewise, carrying at its free end the recessed lug 24 which is bent outwardly and lies horizontally in line for engagement with the valve stem 23 as hereinbefore described. The vertical arm 27 is bent upwardly from the web 28 and its upper extremity is bifurcated and bent inwardly and upwardly at right angles to form off-set projecting angular abutments or cam surfaces 29 and 30 which are oppositely disposed with respect to one another, the bases of said abutments being separated by a horizontal slot 31 as and for the purpose hereinafter described more in detail.

The web ends of the arms 25 and 27 are apertured as at 32 to receive a cylindrical sleeve 33, said sleeve being preferably enlarged at 34 to form an abutting shoulder for the outer face of the vertical arm 27, its opposite end projecting through the aperture in the horizontal arm 25. This sleeve is machined so as to fit tightly within the openings 32, and if desired, may be fixed with respect to the arms to form a fulcrum bearing.

The base of the upright arm 27 is provided with a projecting fin 35, the vertical edge of which is recessed as at 36 to provide spaced shoulders 37 and 38 which, when the device is assembled, are adapted to cooperate with a U-shaped supporting yoke 39 to limit the movement of the valve lever on its fulcrum.

The yoke 39, as before stated, is substantially U-shaped as shown in Fig. 4, its horizontal arms being adapted to embrace the longitudinal extremities of the sleeve 33 with the web of said yoke lying within the recess 36 of the fin 35. The spaced ends of the yoke are apertured as at 40, 40' to register with the bore of the sleeve 33 and to receive a pivot screw 60 (Fig. 1), which extends through the bore of sleeve 33. Preferably the aperture 40 in the arm of the yoke adjacent the enlarged portion 34 of the sleeve is threaded to engage the threads in the screw 60, whereby when the screw is tightened, the arms of the yoke 39 are forced inwardly in frictional engagement with the adjacent ends of the sleeve 33.

The yoke 39 carrying the valve lever 26 is supported on the base 1 by means of a vertical post 41, said yoke fitting over the post and being provided with a vertical slot 42 adapted to receive a set screw 43 which extends into a complementary threaded aperture in the post. Thus, by means of the set screw and slot 42, the yoke and valve lever are capable of vertical adjustment on the post 41 as clearly shown in Fig. 1.

The base 1 carries a vertically disposed housing 44 having a rear wall 45, and supported by this rear wall above the base is an enclosed clock mechanism 46 preferably having a double spring action, but of any suitable design. A shaft 47, driven in counter-clockwise direction by the clock mechanism, projects forwardly through the clock casing and operatively supports a timing disc 48 which is held in spaced relation from the clock casing by a suitable collar (not shown) and retained in fixed position on the clock shaft by a nut or knurled knob 49 screwed onto the threaded end of the shaft 47.

The timing disc 48 is provided adjacent its periphery with a series of annular rows of threaded perforations 50, 51, and 52, each row consisting of sixty uniformly spaced apertures to correspond with the minutes of the hour. It will of course be understood that although I have shown a disc provided with sets of sixty apertures, I do not intend to limit myself to any specific number of apertures or rows thereof, as more or less may be employed to suit varying conditions.

A series of pins having partially threaded stems are adapted to be inserted in the threaded apertures above mentioned, the positions of said pins being determined by the timing desired. In Fig. 1 I have shown a pin 50' in the outer row 50, a pin 51' in the intermediate row 51, a pin 52' in the inner row 52, and a second pin 51'' in the intermediate row 51. The face of the disc 48 may be graduated to correspond with the dial of a clock and provided with suitable indicia so that the pins may be readily adjusted to the desired positions on the disc.

These pins project through the apertures and extend a predetermined distance beyond the rear face of the disc so that as the disc rotates in counterclockwise direction, said projecting ends will engage the abutments 29 and 30 on the arm 27 of the valve lever 26 and ride through the horizontal slot 31 to rock the valve lever on its fulcrum as will later appear in the description of the operation of the device.

Preferably the underside of the base 1 is provided with an internally threaded boss 53 to receive the threaded end of a supporting pipe 54 to facilitate the mounting of the instrument when installed in connection with a fluid control system.

As shown in Fig. 1, the inlet connection 5 leading to passageway 2 is connected to a combined pressure regulator and strainer 55 of any suitable design, interposed between the valve operating fluid conduit 56 and the timing device. Connections 6 and 7 leading from the passageways 3 and 4, respectively, are arranged to place said passageways in communication with separate motor valve diaphragms (not shown). 57, 58, and 59 represent pressure gauges for indicating the pressures in the various passageways with which they are connected, as clearly shown in Fig. 1.

Having thus described the construction and assembly of my improved timing mechanism, its operation is as follows:

Let us assume, for example, that the mechanism is installed in connection with two oil wells, the flowing of each being controlled by a separate motor valve of the direct acting type, that is, a valve which is retained in closed position by diaphragm pressure conducted to the respective motor valves through connections 6 and 7 from a common conduit 56.

As shown in Figs. 1 and 2, the normal or intermediate position of the pilot valve 16 is such as to permit the unrestricted flow of a suitable valve operating pressure fluid such as compressed air or the like, from conduit 56, through strainer 55 and passageway 2 into both passageways 3 and 4 and their respective connections 6 and 7, to retain both motor valves in closed position. In this position of the pilot valve 16, the vertical arm 27 of the valve lever 26 is located as shown in Fig. 1 with the slot 31 in direct line with the projecting stems of any pin located in the intermediate row of apertures 51 in the disc 48.

With the pins and disc in the relative positions shown in Fig. 1, and the disc rotating in counterclockwise direction, it will be noted that the pin 51" has passed through the slot 31, leaving the valve 16 in the neutral position where it will remain until the pin 52' located in the inner row of apertures 52 contacts the abutment 30. As this pin 52' engages the cam surface of the abutment 30, the continued rotation of the disc 48 causes said pin to slide over the surface of the abutment and rock the valve lever 26 to the right, which in turn, through arm 25 and lug 24, moves the pilot valve 16 downwardly in the bore 13. This causes the intermediate head 20 on the pilot valve to shut off communication between passageway 2 and passageway 4 through port 12 and opens communication between passageway 4 and the vent ports 15, 15', permitting the operating medium in the motor valve connected to line 7 to vent to atmosphere, releasing the pressure on the diaphragm and opening the valve. During this operation, the communication between the passageway 2, port 11 and passageway 3 has been uninterrupted and the motor valve connected to line 6 remains closed by the pressure of the operating medium.

It will be noted that due to the frictional engagement of the yoke 39 with the ends of the sleeve 33, the valve lever 26 remains in this position until positively changed by the continued operation of the clock mechanism.

Now then, upon the continued counterclockwise rotation of the disc 48 and after a lapse of fifteen minutes, the pin 51' located in the intermediate row of apertures abuts the oppositely inclined cam surface of abutment 29, sliding over the same and rocking the valve lever to the left, the pin again passing through the slot 31 and returning the pilot valve to neutral position. This again closes both main control valves by admitting pressure to the motor valves through connections 6 and 7.

The parts remain in these positions for a period of twenty-five minutes until the pin 50' located in the outer row of apertures reaches the inclined surface of the abutment 29, whereupon the valve lever is rocked further to the left and, through the medium of arm 25, raises the pilot valve 16 in the bore 13, the head 20 shutting off communication between passageway 2, port 11 and passageway 3, and opening communication between passageway 3, port 11 and the vent ports 14 and 14'. This bleeds the pressure from the motor valve connected to line 6 allowing the valve to open, at the same time permitting the continued pressure communication between passageway 2, port 12 and passageway 4 to retain the motor valve connected to line 7 in closed position.

Should my improved time control mechanism be installed in connection with reverse acting motor valves, that is, valves which are normally closed by spring pressure and opened by diaphragm pressure conducted to the respective motor valves through connections 6 and 7, the enlargements 19a and 21a on the valve member 16 are reduced in length so as to normally leave the vent ports 14 and 15 unobstructed as shown in Fig. 6. Thus, upon the upward movement of the valve 16, the intermediate head 20 enters the bore 13 above port 10 and the lower enlargement 21a closes the vent 15. This permits a maximum pressure to be applied through line 7 to open the motor valve connected thereto, and a minimum pressure is maintained on line 6, permitting the motor valve connected thereto to remain closed. The downward movement of the valve 16 brings the intermediate head 20 into bore 13 below the port 10, opens the vent port 15 and closes the vent port 14, thereby applying a maximum pressure to line 6 and a minimum pressure to line 7. Otherwise the operation of my invention in connection with reverse acting motor valves is the same as that heretofore described.

Obviously, as many pins may be employed in the disc 48 as may be required under the conditions prevailing, and their relative positions may be readily changed from time to time by simply unscrewing the threaded stems and replacing them in the desired apertures.

Furthermore, it may be desirable in some instances to employ a clock mechanism designed to cause any predetermined number of revolutions in a given period, and then remain stationary for a further given period. For example, I may wish to rotate the disc for one complete revolution representing a time of from one to four hours, and then remain stationary for the balance of the twenty-four hour interval, after which this cycle is repeated. It will be obvious from the above that the timing of the rotary disc is not necessarily limited to one revolution per hour.

While I have gone into more or less detail in the description of the particular valve lever and cooperating parts as illustrated in the drawings, it is to be understood that I do not intend to limit myself in any way to this specific structure. Obviously, many variations in the details of this structure are possible with equal effect. The same is true in connection with the timing disc and pins which may also vary in the details of structure.

Furthermore, while I have shown and described this timing mechanism as associated with motor valves for controlling the flow of oil wells and the like, it is obvious that the general principle of my invention may be readily applied in other connections.

From the foregoing it is believed that the construction and advantages of my invention may be readily understood by those skilled in the art without further description, it being borne in mind that numerous changes may be made in the details of structure without departing from the spirit of my invention as set out in the following claims.

What I claim and desire to secure by Letters Patent is:—

1. In a time controlled mechanism including a movable control member, a pivoted arm operatively associated with said member and adapted to move the same to any one of a plurality of positions, a clock mechanism, a rotary disc driven thereby, a series of selective projections carried by said disc, an abutment member carried by said pivoted arm having a plurality of opposed cam surfaces, selectively engageable by said projections to actuate said pivoted arm in different directions, and a slot at the terminus of said cam surfaces through which said projections are adapted to pass at the completion of their engagement with said cam surfaces.

2. Mechanism for controlling the operation of a plurality of valves, comprising a movable control member for regulating the flow of operating fluid to said valves collectively and individually, a pivoted arm operatively associated with said member and adapted to move the same to any one of a plurality of positions, a clock mechanism, a rotary disc driven thereby, a series of selective projections carried by said disc, an abutment member carried by said pivoted arm having a plurality of opposed cam surfaces selectively engageable by said projections to actuate said pivoted arm in different directions, and a slot at the terminus of said cam surfaces through which said projections are adapted to pass at the completion of their engagement with said cam surfaces.

3. The combination with a pilot valve having a neutral position and at least two separate operative positions, a pivoted arm operatively associated with said pilot valve to move the same to any of its various positions, a clock mechanism, a rotary disc driven by said clock mechanism and provided with a plurality of annular rows of apertures, said rows corresponding in number with the number of positions of said pilot valve, a plurality of pins selectively insertable in said apertures and engageable with said pivoted arm to intermittently actuate said pilot valve at predetermined intervals.

4. The combination as claimed in claim 3 wherein said pivoted arm carries an abutment member having a plurality of opposed cam surfaces selectively engageable by said pins to rock said arm in different directions, and a slot at the terminus of said cam surfaces through which said pins are adapted to pass at the completion of their engagement with said cam surfaces.

5. The combination as claimed in claim 3 wherein said pivoted arm carries an abutment member having a plurality of opposed cam surfaces corresponding in number to the operative positions of said pilot valve and selectively engageable by said pins to actuate said pivoted arm in different directions, and a slot at the terminus of said cam surfaces through which said pins are adapted to pass at the completion of their engagement with said cam surfaces.

6. The combination with a pilot valve having a neutral position and at least two separate operative positions, a pivoted arm operatively associated with said pilot valve to move the same to any of its various positions, a clock mechanism, a rotary disc driven by said clock mechanism and provided with a plurality of radial rows of apertures spaced annularly to correspond with predetermined time intervals, a plurality of pins selectively insertable in said apertures and engageable with said pivoted arm to intermittently actuate said pilot valve at predetermined time intervals, to its respective positions.

7. The combination as claimed in claim 6 wherein said pivoted arm carries an off-set abutment member lying in close proximity to one face of said disc, said abutment member having a plurality of opposed cam surfaces, selectively engageable by said pins to actuate said pivoted arm in different directions to control the movement of said pilot valve.

8. The combination as claimed in claim 6 wherein said pivoted arm carries an off-set abutment member lying in close proximity to one face of said disc, said abutment member having a plurality of opposed cam surfaces, selectively engageable by said pins to actuate said pivoted arm in different directions to control the movement of said pilot valve, and means for retaining said pivoted arm in one position until it is positively moved to another position.

9. In a time controlled mechanism including a pilot valve, a pivoted arm operatively connected at one end to said valve and adapted to move the same to any one of a plurality of positions, a clock mechanism, a rotary disc driven thereby, a series of selective projections carried by said disc, a substantially V-shaped abutment member carried by said pivoted arm, the opposed surfaces of said V-shaped member being selectively engageable by said projections to actuate said pivoted arm in different directions, and a slot at the terminus of said opposed surfaces through which said projections are adapted to pass at the completion of their engagement with said surfaces.

10. In a time controlled mechanism including a pilot valve, a pivoted arm operatively connected at one end to said valve and adapted to move the same to any one of a plurality of positions, a clock mechanism, a rotary disc driven thereby, a series of selective projections carried by said disc, an off-set substantially V-shaped abutment member carried by said pivoted arm and lying adjacent one face of said disc, the opposed surfaces of said V-shaped member being selectively engageable by said projections to actuate said pivoted arm in different directions, and a slot at the terminus of said opposed surfaces through which said projections are adapted to pass at the completion of their engagement with said surfaces.

LEON J. GRIFFEY.